United States Patent [19]
Harbeck et al.

[11] Patent Number: 5,513,981
[45] Date of Patent: May 7, 1996

[54] BURNER WITH VARIABLE VOLUME COMBINATION CHAMBER

[75] Inventors: Wolfgang Harbeck, Leubsdorf; Theo Woerner, Waiblingen-Neustadt; Karl Weiss; Rudolf Distl, both of Freiberg, all of Germany

[73] Assignee: Aichelin GmbH, Germany

[21] Appl. No.: 219,822

[22] Filed: Mar. 29, 1994

Related U.S. Application Data

[63] Continuation-in-part of Ser. No. 979,585, Nov. 20, 1992, Pat. No. 5,344,310.

[30] Foreign Application Priority Data

Nov. 22, 1991 [DE] Germany .......................... 41 38 434.2

[51] Int. Cl.[6] ................................................. F23Q 7/06
[52] U.S. Cl. .......................... 431/263; 431/158; 431/189; 431/353; 126/91 A
[58] Field of Search .................................... 431/158, 186, 431/189, 351, 353, 263; 126/91 A

[56] References Cited

U.S. PATENT DOCUMENTS

| | | | |
|---|---|---|---|
| 1,844,315 | 2/1932 | Forney | 431/186 |
| 2,375,625 | 5/1945 | Conway | 431/186 |
| 3,533,717 | 10/1970 | Guerin | 431/186 |
| 4,342,551 | 8/1982 | Browning | 431/158 |
| 4,463,803 | 8/1984 | Wyatt | 166/59 |
| 4,493,309 | 1/1985 | Wedge et al. | 431/158 |
| 4,518,348 | 5/1985 | Wedge et al. | 431/158 |
| 4,586,894 | 5/1986 | Wunning | 431/158 |
| 4,854,853 | 8/1989 | McElroy | 431/158 |
| 5,139,416 | 8/1992 | Wagner et al. | 431/158 |
| 5,344,310 | 9/1994 | Harbeck et al. | 431/158 |

FOREIGN PATENT DOCUMENTS

| | | |
|---|---|---|
| 136928 | 12/1986 | European Pat. Off. . |
| 0243506 | 11/1987 | European Pat. Off. . |
| 0296032 | 12/1988 | European Pat. Off. . |
| 164576 | 1/1989 | European Pat. Off. . |
| 2121103 | 4/1971 | Germany . |
| 150244 | 8/1981 | Germany . |
| 3728712 | 3/1989 | Germany . |
| 4011190 | 10/1991 | Germany . |
| 61-119918 | 6/1986 | Japan . |
| 1304794 | 1/1973 | United Kingdom . |

OTHER PUBLICATIONS

Japanese Patent Abstracts, vol. 10, No. 307 (M–527) [2363], 18.10.86 (Tsumura).

*Primary Examiner*—Carroll B. Dority
*Attorney, Agent, or Firm*—Kokjer, Kircher, Bowman & Johnson

[57] ABSTRACT

A burner for an industrial furnace has a plurality of lines passing through a furnace wall for fuel gas, burner air, and waste gas. Arranged in the furnace space is a combustion chamber (66) in which a mixture of fuel gas and burner air is combusted, and from which a flame (89) is directed into the furnace space. The combustion chamber (66) is delimited by walls (32, 65). The walls (32, 65) are arranged to be movable with respect to one another (65', 65"), so that the volume of the combustion chamber (66) is adjustable (FIG. 2).

11 Claims, 4 Drawing Sheets

BURNER WITH VARIABLE VOLUME COMBINATION CHAMBER

This application is a Continuation-In-Part of U.S. application Ser. No. 07/979,585, filed Nov. 20, 1992, now U.S. Pat. No. 5,344,310 issued Sep. 6, 1994.

The invention relates to a burner for an industrial furnace with lines passing through a furnace wall for fuel gas, burner air, and waste gas, in which there is arranged in the furnace space a combustion chamber in which a mixture of fuel gas and burner air is combusted, and from which a flame is directed into the furnace space, the combustion chamber being delimited by walls.

A burner of the aforesaid type is known from EP-PS 0 164 576.

In the known burner, the combustion chamber is configured as a short tube segment that tapers at the end towards the combustion space and has an opening for emergence of the flame, while the end of the combustion chamber opposite the combustion space consists of a radial plate that is set on the inner end face of the tube.

Present in the radial plate, on one periphery thereof, are openings that allow burner air to enter the combustion chamber. A tubular gas lance is guided through a centered opening in the plate into the interior of the combustion chamber. The gas lance extends into the outer space of the industrial furnace, where fuel gas is applied to it. The aforesaid burner air is supplied to the rear side of the radial plate via an interior space of a recuperator arrangement. The burner air supplied in this manner is, however, divided in the region of the aforesaid radial plate into two partial flows, one of which enters the combustion chamber through the radial plate, while the other flows axially past the combustion chamber and is mixed into the flame as secondary air at the front end of the combustion chamber. For this purpose a nozzle support is provided, which holds the combustion chamber around the front opening in an annular manner by elastically retaining it.

The gas lance is equipped with an electrode that extends axially through it, which extends into the combustion chamber and there ignites a gas/air mixture when the burner is started up.

The known burner thus has the following disadvantages:

Because the combustion chamber consists only of a short tube segment that is sealed off on the inside by the radial plate, the volume of the combustion chamber cannot be modified. A variety of burners are therefore required for different burner outputs and possibly also for different utilization conditions, the design of which must be adapted in each case to the desired combustion chamber volume.

The sealed construction of the combustion chamber in the known burners on the furnace end thereof furthermore has the disadvantage that disassembly of the combustion chamber is very complex, since for this purpose the entire burner must be removed, i.e. pulled out from the industrial furnace, since the combustion chamber is not accessible from outside.

Furthermore, the arrangement of the ignition electrode in the combustion chamber has the disadvantage that an unfavorable gas/air mixture is always present in the combustion chamber in conjunction with the delivery of burner air as the burner is started up. Specifically, if a portion of the burner air is carried past the combustion chamber as secondary air, and if, for example, only 70% of the burner air supplied reaches the combustion chamber, this can cause problems during a cold start of the burner. Although attempts have been made to solve this known problem by delivering less gas when the burner is being started, so that the gas/air mixture in the combustion chamber is optimized for ignition, this trick nevertheless requires additional effort in adjusting the burner, especially during starting, and complicates automatic operation.

The underlying object of the invention is therefore to develop a burner of the aforesaid type in such a way that the aforementioned disadvantages are eliminated. Specific results of the invention are intended to be that the burner design does not need to be modified for a large number of applications, especially for outputs; that the combustion chamber is easily accessible; and that cold-start difficulties are eliminated.

This object is achieved, according to the invention, by the fact that the walls are arranged to be movable with respect to one another, so that the volume of the combustion chamber is adjustable.

The object on which the invention is based is completely achieved in this manner, since the movability of the walls means that the volume of the combustion chamber can be adjusted over a large range. This can occur, alternatively, by the use of different inserts for the combustion chamber, but on the other hand continuous modification of the combustion chamber volume during operation is also possible if the walls are configured so as to be continuously movable.

In a preferred development of the burner according to the invention, in which the combustion chamber is formed by a combustion tube that tapers at one outlet end and in which a radial plate is arranged at a distance from the tapered end, a particularly good effect is attained by the fact that the combustion tube extends axially beyond the plate, and that the plate is arranged in an axially displaceable manner in the combustion tube.

This means that the combustion chamber volume can be modified in a physically very simple manner, since the plate simply needs to be moved axially in the combustion tube, like a piston in a cylinder.

In a preferred development of this variant, in which the plate is arranged at the inner end of a tubular gas lance and burner air is delivered to the inner end of the gas lance and passes through openings in the plate, the advantageous result is that the axial displaceability of the plate is achieved by the use of gas lances of different lengths.

The advantage of this feature is therefore that the combustion chamber volume can be varied simply by utilizing gas lances of different lengths. When testing the burner for a specific application, it is therefore possible to use gas lances of different lengths in succession, thereby optimizing the combustion chamber volume, which then, after insertion of a gas lance of optimum length, remains at the size set. In this case additional adjustment mechanisms are not necessary.

In an alternative embodiment in which the plate is also arranged at the inner end of a tubular gas lance, and burner air is fed to the inner end of the gas lance and passes through openings in the plate, axial displaceability of the plate is achieved by the fact that an axially displaceable gas lance is used.

The advantage of this feature is that continuous adjustment of the combustion chamber volume is possible, for example even while the burner is in operation, thus allowing fine-tuning by which the combustion chamber can be adjusted to the optimum size.

In other preferred embodiments of the invention in which the burner is embodied with the combustion tube, the combustion tube passes through axially to an outer space of the furnace.

The advantage of this feature is that the combustion chamber is accessible from outside even when the combustion tube is not disassembled, since all that is needed is to pull the gas lance, with the plate, out of the combustion tube, and the combustion chamber at the lower end of the combustion tube is then also accessible from outside. This eliminates complex disassembly or the need to fish out an axially short combustion chamber using a long hook, as is necessary in the prior art.

A further variant of the invention with a combustion tube is characterized by the fact that the combustion tube is axially elastically held only at its end towards the outer space.

The advantage of this feature is that single-ended retention of the combustion tube requires particular attention to problems resulting from thermal expansion of the combustion tube. Specifically, if with the burner according to the invention the combustion tube expands, for example due to heating, this has no effect on retention, since this occurs, as mentioned, only at one end of the combustion tube, and the other end of the combustion tube can therefore move within sufficient limits.

With the two last-mentioned exemplary embodiments, it is also advantageous if burner air is delivered externally to the combustion tube at the height of the outer space, and openings are arranged in the combustion tube upstream from the plate, so that the burner air flows partly as primary air into the interior of the combustion tube, and partly as secondary air to one end of the combustion tube.

The advantage of this feature is that the percentage distribution of the partial flows can be physically defined by the position and dimensions of the openings.

In a further exemplary embodiment of the invention in which a recuperator tube coaxially surrounds the combustion tube, it is especially preferred if the combustion tube is guided at its tapered end, in an axially movable manner, in one end of the recuperator tube on the furnace space side.

This feature has on the one hand the advantage, already mentioned, that the combustion tube is retained at one end and can axially expand or contract at the end that is not retained. On the other hand, this feature has the advantage that the free end of the combustion tube is held radially.

In further exemplary embodiments of the invention, the combustion tube is made, at least in the region of the combustion chamber, of a high-temperature ceramic. Alternatively, the entire combustion tube can be made of the high-temperature ceramic, but on the other hand it is also possible to configure the combustion tube in multiple pieces, and to make the multiple pieces of different materials. In this case only the combustion chamber region can be made of a high-temperature ceramic, while the other regions can be made of a different, less expensive material.

Further advantages are evident from the description and from the attached drawings.

It is understood that the features mentioned above and those yet to be explained below can be used not only in the respective combinations indicated, but also in other combinations or in isolation, without leaving the scope of the present invention.

Exemplary embodiments of the invention are depicted in the drawings and will be explained further in the description which follows. In the drawings.

Figure 1:
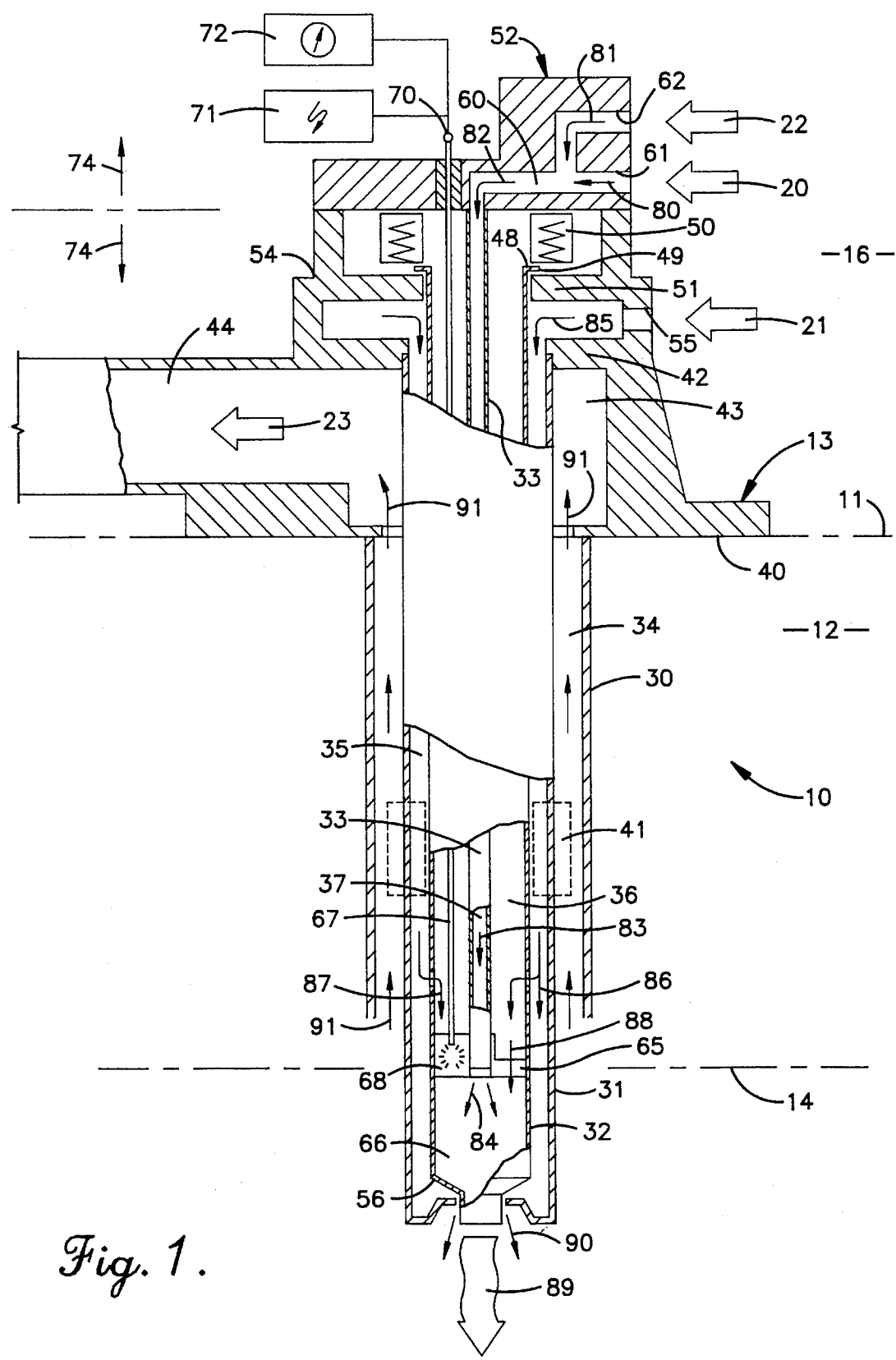
FIG. 1 shows a highly simplified overall side view, partly cut away and sectioned, of an exemplary embodiment of a burner according to the invention.

In the Figures, the number 10 generally designates a burner as used for industrial furnaces, for example for diffusion heat treatment of metal workpieces.

The burner 10 is inserted into an outer surface 11 of an industrial furnace 11 (not depicted further). The burner 10 thereby passes through a furnace wall 12, being set with a fastening flange 13 onto the outer surface 11 and, for example, bolted there. The burner 10 extends at its lower end in FIG. 1 beyond an inner surface 14 of the furnace wall 12, and thus projects into a furnace space 15. The supply lines and control units of the burner 10, on the other hand, are arranged in an outer space 16 outside the furnace wall 12.

In the outer space 16, the burner 10 is provided with a total of four supply and discharge lines for process media. For example, fuel gas 20, burner air 21, and purge air 22 are supplied to the burner 10, while waste gas 23 is discharged from the burner 10.

Aside from the supply and discharge lines in the region above the flange 13, the burner is essentially coaxial in the configuration of its functional components. Thus the burner 10 preferably has an outer recuperator wall 30 and an inner recuperator tube 31. The inner recuperator tube 31 in turn encloses a combustion tube 32, which is preferably made of a ceramic. Located at the center, in other words on the lengthwise axis of the burner 10, is a tubular gas lance 33.

A first, hollow cylindrical cavity 34, through which waste gas is withdrawn, is therefore created between the outer recuperator wall 30 and inner recuperator tube 31. A second hollow cylindrical cavity 35 between the inner recuperator tube 31 and combustion tube 32 is used to supply burner air, while a third cavity 36, also essentially of hollow cylindrical shape, between the combustion tube 32 and gas lance 33 is used on the one hand again for delivery of burner air, but on the other hand also to accommodate an electrode, as will be explained later on in detail. Lastly, the gas lance 33 has an interior space 37 through which fuel gas or a mixture of fuel gas and purge air can be supplied.

The outer recuperator wall 30 extends in FIG. 1 upward to an inner side 40 of the flange 13. In this axial region the inner recuperator tube 31 is provided with a plurality of radial heat-transfer plates 41, which project at one end into the first cavity 34 and at the other end into the second cavity 35, and are attached in a thermally conductive manner to the inner recuperator tube 31. This produces, in a known manner, heat exchange between the hot waste gases discharged in the first cavity 34, and the burner air flowing in through the second cavity 35.

In FIG. 1 the inner recuperator tube 31 extends axially farther upward than the outer recuperator wall 30. The inner recuperator tube 31 is held, at its upper end in FIG. 1, in a gas-tight manner in a first intermediate flange 42 of the flange 13. This produces, between the first intermediate flange 42 and the inner side 40 of the flange 13, an annular space 43 that is connected to a waste-gas tube 44. The annular space 43 receives and collects the waste gases discharged in the first cavity 34, and transfers them into the waste-gas tube 44.

In FIG. 1, the combustion tube 32 projects axially farther upward than the inner recuperator tube 31. The combustion tube 32 is provided, at the top in FIG. 1, with an end 48 that is folded outward, thus forming an annular shoulder. The folded-out end 48 sits, by means of a flexible seal 49, for example an O-ring, on a second intermediate flange 51 of the flange 13. The folded-out end 48 is pressed on by means of a spring washer 50, by the fact that a cover 52 is threaded from above onto the flange 13. The spring washer 50 is indicated only very schematically; it can consist, for example, of a metal ring that is braced by means of a plurality of individual springs against the cover 52, thereby pressing the folded-out end 48 against the flexible seal 49 and therefore the second intermediate flange 51. The result is therefore that the combustion tube 32 is retained only at its top end, in an elastic manner.

Located between the two intermediate flanges 42 and 51 is a further annular space 54 that is provided with an inlet 55 for burner air 21. Burner air 21 can thus flow through the inlet 55 and the annular space 54 into the second cavity 35 between the inner recuperator tube 31 and combustion tube 32.

Figure 2:
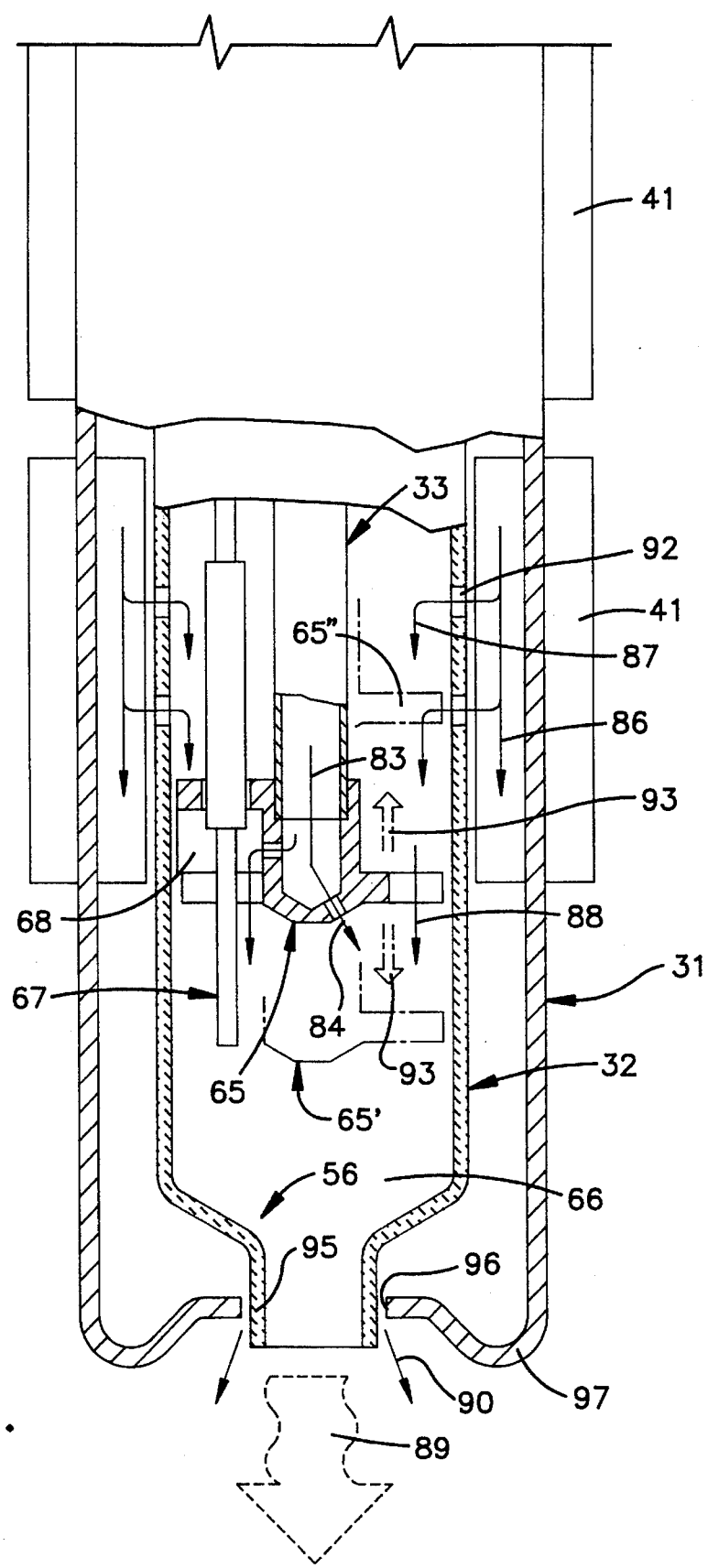
FIG. 2 shows the combustion-chamber end of the burner according to FIG. 1, at enlarged scale.

The combustion tube 32 is configured so as to taper at its lower end which projects into the furnace space 15, as is particularly clearly evident from FIGS. 1 and 2.

Configured in the cover 52 is a channel 60 that is connected to the upper end of the gas lance 33. The channel 60 is divided towards the outside into two subchannels, one of which forms an inlet 61 for fuel gas 20, and the other an inlet 62 for purge air 22.

The gas lance 33 is provided at its lower end with a plate 65 that extends radially in the combustion tube 32 and thus forms an upper end wall for a combustion chamber 66. The combustion chamber 66 thus extends at the lower end of the combustion tube 32 from the radial plate 65 to the tapered end 56.

An electrode 67 is arranged axially in the third cavity 36 between the combustion tube 32 and gas lance 33. The lower end of the electrode 67 opens into an ignition chamber 68 that constitutes an integral component of the plate 65.

The upper end of the electrode 67 is provided with a connector 70. The connector 70 is guided on the one hand to an ignition device 71, and on the other hand to an ion current meter 72.

An arrow 74 indicates that the cover 52 can be removed from the flange 13 together with the gas lance 33 and the plate 65, fastened thereto, and the electrode 67. After removal of the cover 52, the spring washer 50 can then be removed, and the combustion tube 32 can be pulled out.

On the other hand, the arrow 74 is also intended to indicate that gas lances 33 and electrodes 67 of different lengths can be utilized at the cover 52, or even that the gas lance 33 and electrode 67 can be continuously adjustable as to length, for example by means of telescoping arrangements, gas-tight passthroughs, and so forth.

The various media flows in the burner 10 according to FIG. 1 will now be explained briefly:

An arrow 80 indicates that fuel gas 20 flows in through the inlet 61 into the channel 60. The arrow 81 indicates that purge air 22 can be mixed in via the inlet 62 with the fuel gas 20 in the channel 60. The gas/air mixture then flows in the channel 60, in the direction of the arrow 82, into the interior space 37 of the gas lance 33 (downward in FIG. 1), as indicated by an arrow 83. At the lower end of the gas lance 33 the gas/air mixture enters the combustion chamber 66, as indicated by an arrow 84.

An arrow 85 indicates that burner air 21 flows in through the inlet 55 and is guided downward in FIG. 1 in the second cavity 35. As is also evident particularly clearly from FIG. 2, the burner air flow is divided at the lower end of the combustion tube 32, but upstream from the plate 65, by the fact that a first partial air flow (arrow 86) flows farther downward in the second cavity 35, while another partial flow (arrow 87) passes through openings 92 (FIG. 2) in the combustion tube, and there flows downward in FIGS. 1 and 2 in the third cavity.

Number 88 indicates that the partial air flow guided in the third cavity 36 once again flows partially through plate 65 (as explained further in FIG. 3), and passes into the combustion chamber 66.

When the burner 10 is in operation, a gas/air mixture is therefore combusted in the combustion chamber 66, and emerges downward as a flame 89. The arrows 90 indicate that the partial air flow (arrow 86) of burner air 21 in the lower end of the second cavity 35 is mixed into the flame 89 as secondary air. This is possible because the tapered end 57 of the combustion tube 32 is separated from the lower end of the inner recuperator tube by an annular gap.

The waste gases produced in the furnace space 15 rise in the direction of the arrows 91 in the first cavity 34 (upward in FIG. 1), are deflected in the annular space 43, and then emerge as waste gas 23 through the waste-gas tube 44.

Further design details at the lower end of the burner 10 are evident from the enlarged depiction of FIG. 2.

It is first of all evident that the combustion tube 32 terminates at the tapered end 56 in a muzzle tube 95 that is arranged by means of an annular gap 96 in a bulged-out end 97 of the inner recuperator tube 31. The axial length of the muzzle tube 95 is dimensioned so that the combustion tube 32 can expand and contract, within the range of its operating temperatures, so that the muzzle tube 95 moves within the annular gap 96.

It is also clearly evident in FIG. 2 from the dot-dash depictions 65' and 65" that the plate 65 can be positioned differently inside the combustion tube 32 in terms of its axial position. The volume of the combustion chamber 66 can be adjusted in this manner. Since the plate 65 is arranged with a radial clearance inside the combustion tube 32, and on the other hand is held only by the gas lance 33 and the electrode 67, one need only vary the length of the gas lance 33 or electrode 67 in order to adjust the axial position of the plate 65, as indicated by an arrow 93 in FIG. 2.

The volume of the combustion chamber 66 can be adjusted manually by positioning the plate 65 together with the gas lance 33 and the electrode 67 in different axial positions inside the combustion tube 32, as desired.

Figure 1A:
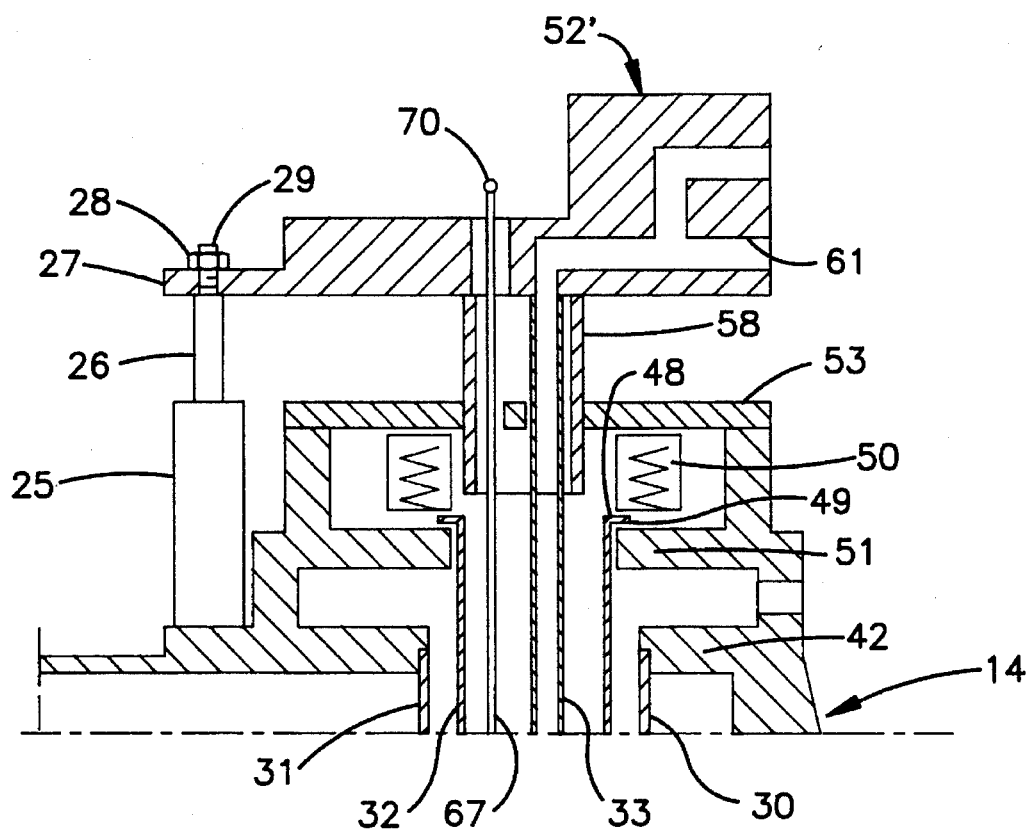
FIG. 1a shows a modification of the embodiment according to FIG. 1, allowing to adjust the volume of the combustion chamber.

However, such a variation of the volume of the combustion chamber 66 can also be attained automatically as depicted in FIG. 1a showing a modification of the burner depicted in FIG. 1.

FIG. 1a shows the upper part of the burner which is similar to the embodiment according to FIG. 1, but which includes an additional plate mounting means allowing to place the radial plate 65 (FIG. 1) at various longitudinal positions within the tube 32. Thereby, the volume of the combustion chamber 66 can be varied selectively.

In FIG. 1a parts corresponding to the embodiment of FIG. 1 are depicted by the same reference numbers.

The cover 52' according to FIG. 1a corresponds to cover 52 according to FIG. 1, however, is placed at an axial distance from the upper end of second intermediate flange 51. Intermediate flange 51 is covered at its top end by a cover plate 53 through which gas lance 33 and the electrode 67 extend which are protected by a common protection tube 58 which is supported on cover 52'.

On one side of intermediate flange 42 there is arranged a piston-and-cylinder unit 25, 26 comprising a cylinder 25 which is supported on intermediate flange 42 and in which a cylinder 26 can be moved by applying hydraulic or pneumatic pressure. Piston 26 comprises a protrusion 27 at its upper end carrying threads 29 extending through an appropriate opening of cover 52' and fixed by a nut 28 which is screwed onto threads 29. Piston 26 which is hydraulically or pneumatically driven by a suitable hydraulic or pneumatic pressure supplied via an appropriate valve arrangement (not shown) may be extended or retracted into cylinder 25 selectively as desired.

Thereby, cover 52' which is supported by the piston 26 can be axially displaced with respect to the combustion tube 32.

Since gas lance 33 and electrode 67 are both mounted on cover 52', they are commonly moved in axial direction when the piston 26 is extended or retracted.

Electrode 67 preferably comprises a rigid structure that can be introduced into the ignition chamber 68 without needing any additional support.

In a modification of this embodiment, electrode 67 could be secured to cover plate 53 and could be slidably arranged within cover 52'. According to this modification, only gas lance 33 would be moved axially when moving the cover 52' by the piston-and-cylinder unit 25, 26 while the axial position of electrode 67 within combustion tube 32 would remain fixed. This is possible because of the preferred rigid structure of electrode 67.

In a further modification of the first embodiment depicted in FIG. 1a, the piston-and-cylinder unit 25, 26 could be replaced by a simple guidance serving to prevent rotation of cover 52' about the longitudinal axis of the burner to maintain electrode position. Cover 52' could then be moved manually to adjust the axial position of gas lance 33 together with electrode 67 which is also held on cover 52'.

According to an even further modification of this embodiment simply different gas lances 33 together with appropriate electrodes 67 could be fixed on cover 52 according to the embodiment of FIG. 1a and would allow a variation of the volume of the combustion chamber 66 by merely replacing a cover 52 with a gas lance 33 and an electrode 67 having a first axial length by a cover plate 52 holding a gas lance 33 and an appropriate electrode 67 with a different axial length or by merely replacing the gas lance 33 by another gas lance with a different length and keeping the same electrode 67.

Figure 3:
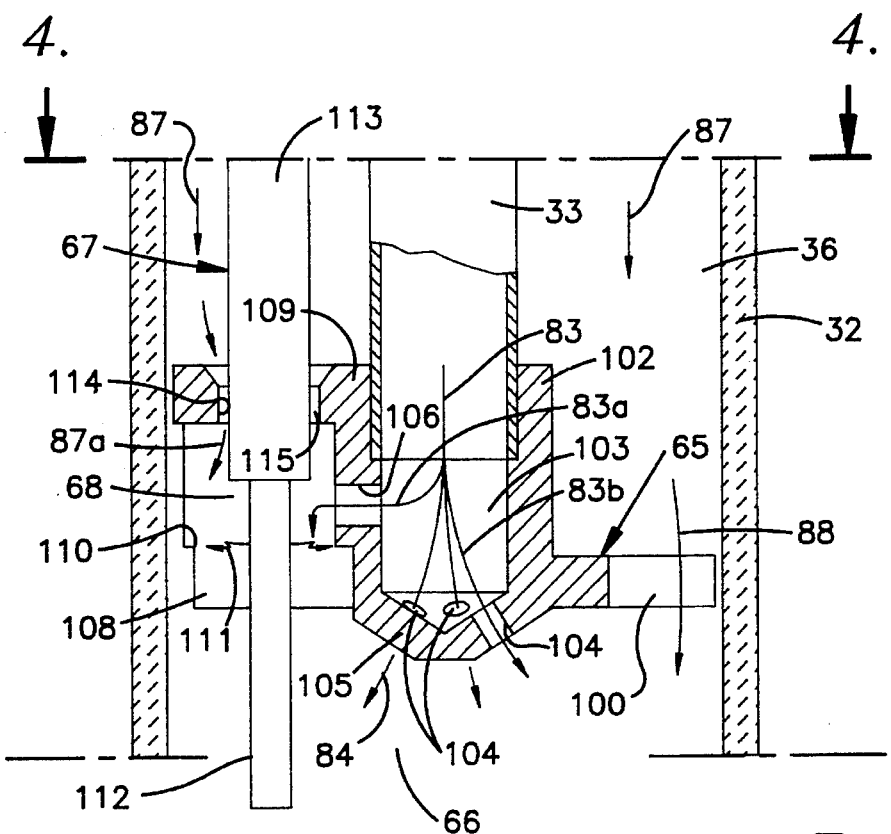
FIG. 3 shows a detail of FIG. 2, at even further enlarged scale, in a sectioned depiction along lines III—III of FIG. 4.
Figure 4:
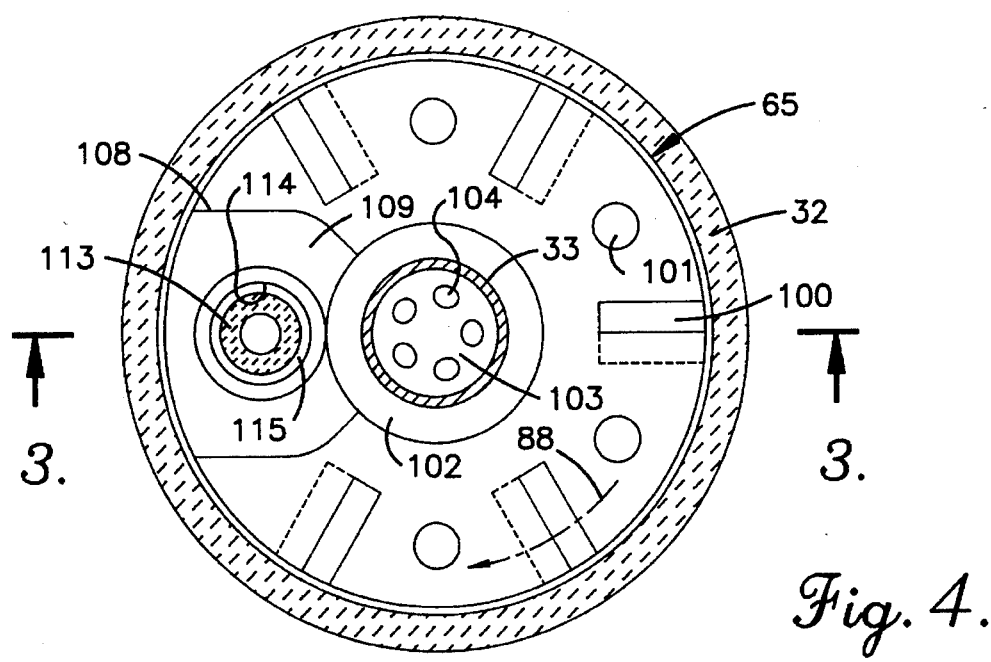
FIG. 4 shows a top view of the arrangement according to FIG. 3, in the direction of the arrows IV—IV of FIG. 3.

Referring now to the even further enlarged detailed depiction in FIGS. 3 and 4, it is first of all evident that the plate 65 is provided in the region of its periphery with a total of five slits 100, which extend obliquely with respect to the surface of the plate 65. The primary air for the combustion chamber 66, flowing through the slits 100 in the direction of arrow 88, is thereby given a spin, meaning that it is introduced circumferentially into the combustion chamber 66. Axial orifices 101 are also provided in the plate 65.

At the center, the plate 65 is provided with a neck 102, projecting axially upward, that encloses a cavity 103. The lower end of the gas lance 33 is inserted in a gas-tight manner, for example by being welded, into the top end of the neck 102.

The cavity 103 communicates with the combustion chamber 66 through five orifices 104. The five orifices 104 are regularly arranged in a downwardly projecting end 105 of the plate 65. It is understood that the orifices 104 can also be provided in a different quantity or shape, or that the orifices 104 can also be used to impart a certain orientation to the gas flowing through them.

The cavity 103 in the neck 102 communicates with the ignition chamber 68 through a lateral orifice 106. The ignition chamber 68 is located radially alongside the cavity 103. The ignition chamber 68 is delimited axially at the top by a chamber wall 109 that is shaped as a single unit onto the neck 102. Below the radially extending chamber wall 109, the ignition chamber 68 is delimited internally by the neck 102 and externally by the wall of the combustion tube 32.

For this purpose, the neck 102 merges into a wall element 108, U-shaped in the top view of FIG. 4, that leads from the neck 102 to the wall of the combustion tube 32.

The wall element 108 that thus laterally encloses the ignition chamber 68 is provided with a circumferential rim 110 beneath—i.e. downstream from—the lateral orifice 106. The circumferential rim 110 is configured with a sharp edge so that a spark path 111 can form between the circumferential rim 110, acting as the ground counterelectrode, and a center electrode 112 of the ignition electrode 67. As a result, the arrangement is also such that the volume of the ignition chamber 68 increases from top to bottom as depicted in FIG. 3, since a segment of the ignition chamber 68 with a greater volume adjoins below the circumferential rim 110.

In order to insulate the ignition electrode 67 from the plate 65, which is at ground potential, the center electrode 112 is surrounded in this region by a ceramic sheath 113. The ceramic sheath 113 fits with a clearance into an orifice 114 in the chamber wall 109, leaving an annular gap 115.

The arrangement according to FIGS. 3 and 4 functions as follows:

It has already been mentioned that a partial flow 87 of burner air 21 that has previously passed through the openings 42 in the combustion tube 32 flows in the third cavity 36 between combustion tube 32 and gas lance 33 just above plate 65, as clearly shown in FIG. 2.

This partial flow 87 then branches again into a portion (arrow 88) that flows through the slits 100 and the orifices 101 in the plate 65 into the combustion chamber 66, and a second portion (arrow 87a) that passes through the annular gap 115 into the ignition chamber 68.

Correspondingly, the flow of fuel gas 20 (arrow 83) divides in the gas lance 33 into two partial flows 83a and 83b. The partial flow 83a passes through the lateral orifice 106 from the cavity 103 into the ignition chamber 68, while the other partial flow 83b flows downward through the orifices 104 into the combustion chamber 66.

By appropriate dimensioning of the annular gap 115 and of the lateral orifice 106 it is possible (in conjunction with the respective pressures of the fuel gas 20 and burner air 21) to produce in the ignition chamber 68 a gas/air mixture that is optimally ignitable. The gas/air mixture in the combustion chamber 66 can be adjusted on this basis, again by dimensioning the corresponding cross sections of the slits 100, orifices 101, and orifices 104.

It is understood that numerous variations are possible within the context of this invention without thereby going beyond the context of the invention.

For example, the burner 10 can be operated with gaseous or with liquid fuels. Its field of application is moreover not confined to the heating of industrial furnaces; rather the burner 10 can also be used in other types of furnaces.

Moreover, the ignition electrode 67 can be used not only to ignite a gas/air mixture or more generally a fuel/air mixture in the ignition chamber 68, for which ignition voltages on the order of between 6 and 10 kV are required; rather the ignition electrode 67 can also, as already indicated by the ion current meter 72, be used to monitor the burner while it is in operation. For this purpose, as the burner operates, measurements are made of the ion current that results in the burner atmosphere from application of a small DC voltage between center electrode 112 and ground, this ion current then being on the order of between 6 and 16 μA.

While the mixture present in the ignition chamber 68 is combusted as completely as possible as the burner 10 operates, incomplete combustion of the fuel with primary and purge air is preferably provided in the combustion chamber 66.

Moreover, the embodiment in terms of the burner 10 can be such that the heat-transfer plates 41 additionally constitute radial stabilization of the inner recuperator tube 31 within the outer recuperator wall 30. The outer recuperator wall 30 can be either a separate tube or a permanent constituent of the furnace wall 12.

We claim:

1. A burner for an industrial furnace, comprising:
   a first burner portion located outside the furnace, the first burner portion having first connector means for feeding a fuel, second connector means for feeding air, and third connector means for electrical energy;
   a first tube mounted to said first burner portion and having a free end within the furnace, said first tube being operatively connected to said second connector means for feeding the air;
   a second tube extending within said first tube, and having a first end which is operatively connected to said first connector means;
   a radial plate mounted within said first tube, said radial plate having an opening therethrough operatively connected to said first connector means for feeding a fuel and through which the fuel may pass, and said plate permitting the air to pass thereby to reach said free end of said first tube such that the portion of the first tube extending between said free end and said radial plate, together with said radial plate, defines a combustion chamber;
   an ignition chamber arranged on said radial plate adjacent said combustion chamber;
   an electrode mounted within said ignition chamber and operatively connected to said third means feeding electrical energy; and
   tube mounting means, permitting operative mounting of said second tube at various longitudinal positions within said first tube with respect to said free end, for varying the volume of said combustion chamber.

2. The burner of claim 1, wherein said ignition chamber is arranged within said plate.

3. The burner of claim 2, wherein said electrode is mounted on said plate.

4. The burner of claim 1, wherein said second tube comprises a lance extending within said first tube and mounted to said first burner portion for sliding movement in directions toward and away from said free end of said first tube.

5. The burner of claim 4, wherein said tube mounting means further comprises means for moving said lance with respect to said first burner portion in said directions.

6. The burner of claim 5, wherein said electrode is mounted upon said plate.

7. The burner of claim 5, wherein said means for moving said lance comprises a piston and cylinder combination, having a first end fixed with respect to said first burner portion and a second end fixed with respect to said lance.

8. The burner of claim 7, wherein said electrode is mounted upon said plate.

9. The burner of claim 1, wherein said first burner portion includes an inner flange section and an outer cover section separated from each other along a radial plane, said inner flange section supporting said first tube, and said outer cover section supporting said second tube.

10. The burner of claim 9, further comprising resilient means for elastically supporting said first cylindrical tube upon said inner flange section.

11. The burner of claim 1, further comprising a third tube surrounding said first tube to define a passage therebetween, and having a free end in proximity to said free end of said first tube, said third tube being operatively connected to said second connector means for feeding air, and wherein said first tube includes an opening allowing air from said passage to pass in to the interior of said first tube to act as primary air, a remainder of the air from said passage acting as secondary air.

* * * * *